(12) United States Patent
Sisk

(10) Patent No.: US 8,157,294 B2
(45) Date of Patent: Apr. 17, 2012

(54) GLUELESS WHIRLPOOL FITTINGS

(75) Inventor: Thomas J. Sisk, Moonstone (CA)

(73) Assignee: Masco Corporation, Taylor, MI (US)

( * ) Notice: Subject to any disclaimer, the term of this patent is extended or adjusted under 35 U.S.C. 154(b) by 133 days.

(21) Appl. No.: 12/635,173

(22) Filed: Dec. 10, 2009

(65) Prior Publication Data

US 2011/0140409 A1 Jun. 16, 2011

(51) Int. Cl.
*F16L 33/00* (2006.01)
(52) U.S. Cl. .......................................... 285/243
(58) Field of Classification Search .................. 285/322, 285/324, 314, 313, 243, 248
See application file for complete search history.

(56) References Cited

U.S. PATENT DOCUMENTS

| | | | | |
|---|---|---|---|---|
| 921,368 | A * | 5/1909 | Muller | 285/314 |
| 0,996,114 | A | 6/1911 | Muller | |
| 3,285,551 | A | 11/1966 | Tschanz | |
| 3,476,412 | A * | 11/1969 | Demler, Sr | 285/322 |
| 3,667,783 | A | 6/1972 | Sotolongo | |
| 4,250,348 | A | 2/1981 | Kitagawa | |
| 4,358,079 | A | 11/1982 | Navarro | |
| 4,387,267 | A | 6/1983 | Becker | |
| 4,513,172 | A | 4/1985 | Matsui | |
| 4,632,437 | A * | 12/1986 | Robson et al. | 285/314 |
| 4,666,192 | A * | 5/1987 | Zamora | 285/322 |
| 4,738,636 | A | 4/1988 | Bolante | |
| 4,787,657 | A | 11/1988 | Henniger | |
| 4,814,547 | A | 3/1989 | Riley et al. | |
| 4,891,470 | A | 1/1990 | Studenski | |
| 4,998,831 | A * | 3/1991 | Proni | 285/322 |
| 5,048,872 | A * | 9/1991 | Gehring | 285/322 |
| 5,068,496 | A | 11/1991 | Favalora | |
| 5,132,493 | A | 7/1992 | Sheehan | |
| 5,171,043 | A * | 12/1992 | Ronda et al. | 285/322 |
| 5,378,027 | A * | 1/1995 | Gehring | 285/322 |
| 5,797,633 | A | 8/1998 | Katzer et al. | |
| 5,866,853 | A | 2/1999 | Sheehan | |
| 6,056,326 | A * | 5/2000 | Guest | 285/322 |
| 6,478,343 | B2 * | 11/2002 | King Lee | 285/322 |
| 6,488,317 | B1 * | 12/2002 | Daoud | 285/322 |
| 6,880,865 | B2 * | 4/2005 | Guest | 285/322 |
| 6,905,080 | B2 | 6/2005 | Pohorecki | |
| 6,905,142 | B2 * | 6/2005 | Do et al. | 285/322 |
| 6,957,833 | B2 * | 10/2005 | Guest | 285/322 |
| 7,032,932 | B2 * | 4/2006 | Guest | 285/322 |
| 7,100,948 | B2 * | 9/2006 | Guest | 285/322 |
| 7,185,923 | B2 | 3/2007 | McNeil et al. | |
| 7,240,925 | B2 * | 7/2007 | Fukano et al. | 285/322 |
| 7,410,193 | B2 * | 8/2008 | Guest | 285/322 |
| 7,425,022 | B2 * | 9/2008 | Guest | 285/322 |
| 7,504,582 | B1 * | 3/2009 | Chiu | 285/322 |
| 7,543,858 | B1 * | 6/2009 | Wang | 285/314 |

* cited by examiner

*Primary Examiner* — David E Bochna
(74) *Attorney, Agent, or Firm* — Carlson, Gaskey & Olds, P.C.

(57) ABSTRACT

A fitting for a whirlpool joins a pair of pipes. The fitting includes a coupling from which one of the pipes extends, the coupling having a flexible member adapted to cause a seal to sealingly engage the pipes or the pipes to seal against themselves, and a first thread. A nut engages the coupling and has a second thread for engaging the first thread and a surface for engaging the flexible member and causing the seal to sealingly engage the pipes or the pipes to sealingly engage themselves while the second thread engages the first thread. The first thread and the second thread have an angle whereby the flexible member causes the seal to sealingly engage the first and second pipes or the pipes to sealingly engage themselves in a quarter turn of the nut.

10 Claims, 3 Drawing Sheets

GLUELESS WHIRLPOOL FITTINGS

BACKGROUND OF THE INVENTION

Typically in hard to get at areas, whirlpool-type baths and other applications utilize solvent cement on PVC joints. Solvent cements create efficient seals to prevent leakage. These solvent cements, however, may emit gas that contributes to the green house effect. Other types of connectors are known but it is difficult to detect whether an efficient seal is created. Knowing when an effective seal is made is important particularly since these joints are hidden behind and under whirlpools and spas and other types of hard to get to equipment.

SUMMARY OF THE INVENTION

According to a non-limiting embodiment, a fitting for a whirlpool joins a flexible pipe that fits over another pipe. The fitting includes a coupling from which one of the pipes extends, the coupling having a flexible member adapted to cause the first pipe to sealingly engage the second pipe, and a first thread. The fitting also includes a nut that engages the fitting, the nut having a second thread for engaging the first thread and a surface for engaging the flexible member and causing the flexible member to sealingly engage the first and second pipes while the second thread engages the first thread. The first thread and the second thread have an angle whereby the flexible member causes the flexible member to sealingly engage the first and second pipes in a quarter turn of the nut.

According to another non-limiting embodiment, a fitting for a whirlpool joins a pair of pipes and includes a seal that extends over the first pipe and the second pipe. The fitting includes a coupling from which one of the pipes extends, the coupling having a flexible member adapted to cause the seal to sealingly engage the pipes, and a first thread. A nut engages the coupling and has a second thread for engaging the first thread and a surface for engaging the flexible member and causing the seal to sealingly engage the pipes while the second thread engages the first thread. The first thread and the second thread have an angle whereby the flexible member causes the seal to sealingly engage the first and second pipes in a quarter turn of the nut.

According to a feature of the invention, the coupling has a first surface and the nut has a second surface cooperating with the first surface such that the nut does not back off the coupling after turning a quarter turn on the coupling.

By using the quarter turn system and lock a user can quickly and effectively seal a pipe joint that is intended to be disclosed behind walls.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
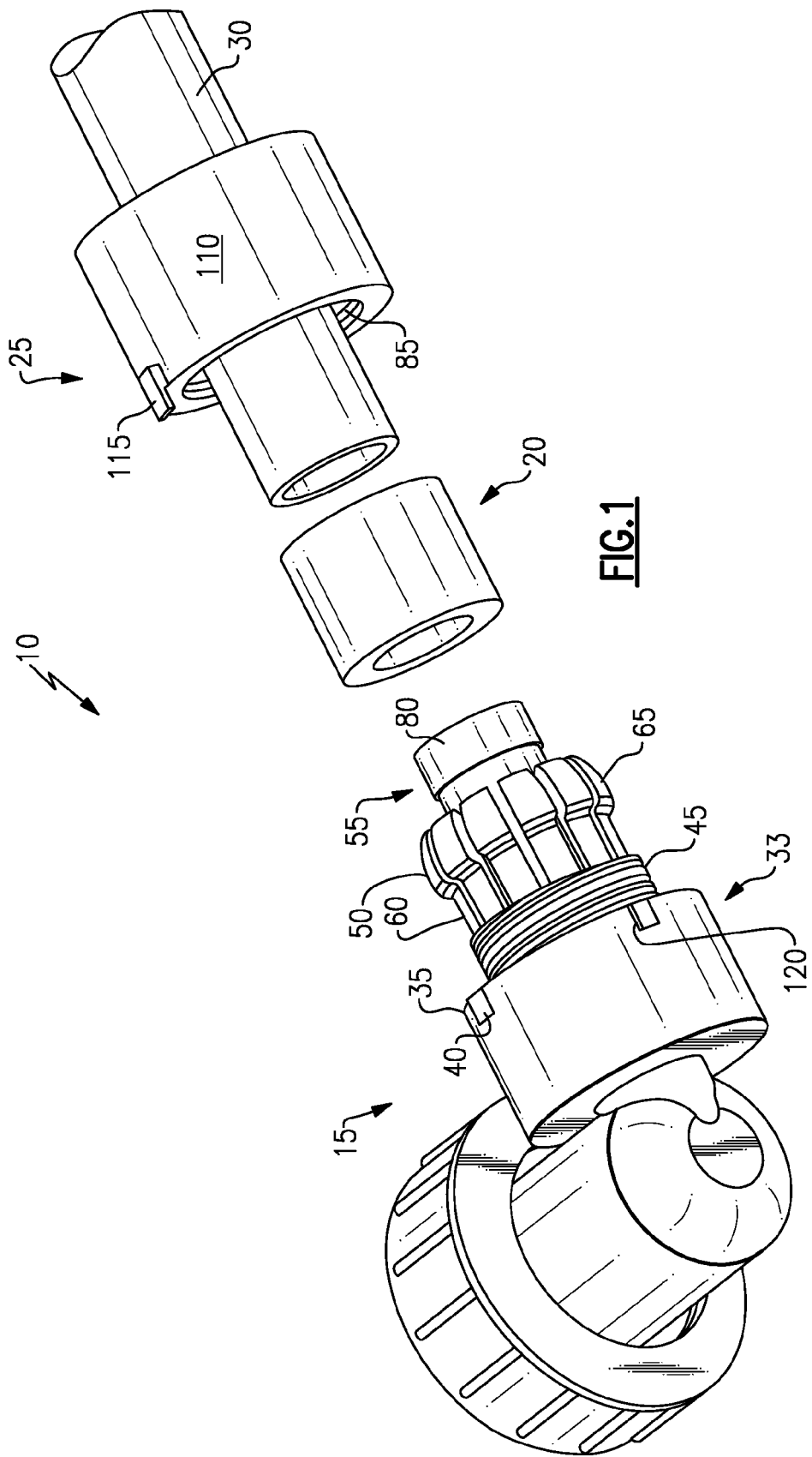
FIG. 1 is a perspective view of an embodiment of a sealing system.
Figure 2:
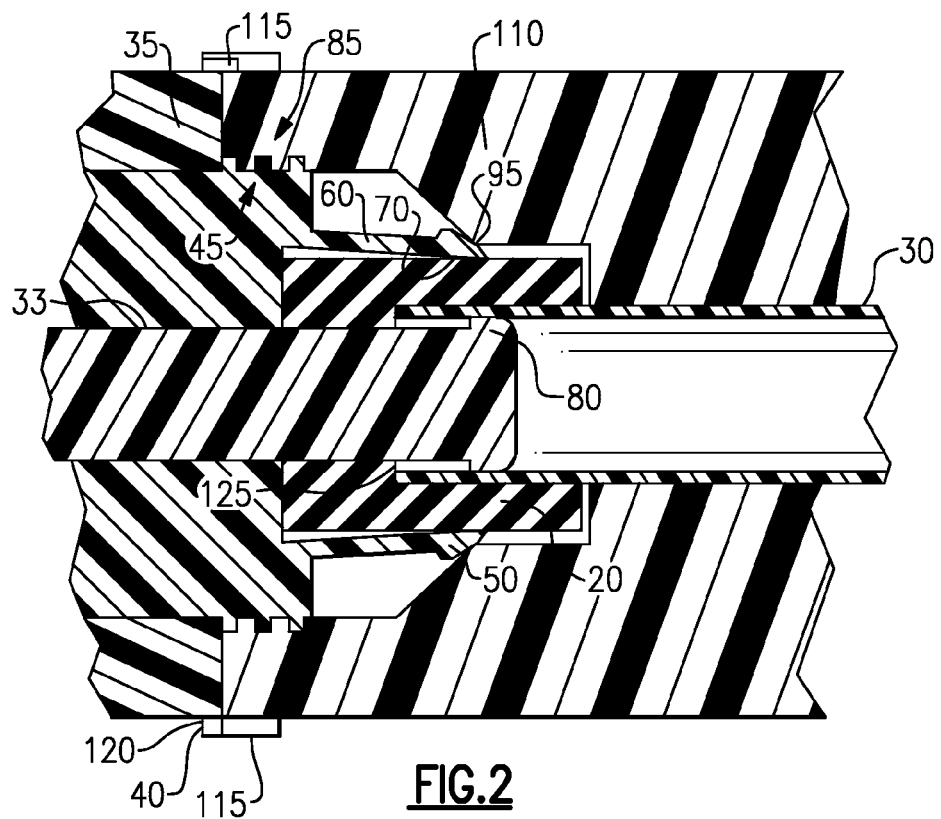
FIG. 2 is a schematic view of the sealing system of FIG. 1.
Figure 3:
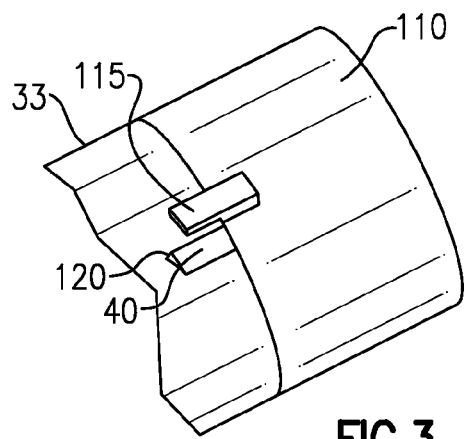
FIG. 3 is a perspective view of the lock of the sealing system of FIG. 2.

Referring now to FIGS. 1, 2 and 3, a first embodiment of the coupling 10 of the invention is shown. The coupling has a fitting 15, an elastomeric sealing ring 20, a compression nut 25, and a pipe 30. The sealing ring though described herein as an elastomer may be comprised of any suitable sealing material. Similarly the fitting, compression nut and pipe may be PVC or other suitable material.

The fitting 15 has a body 33, having an outer end 35, upon which four ramps 40 are disposed about 90° apart, a threaded section 45 with four threads also about 90° apart, which will be discussed herein, a plurality of fingers 50 extending from the body, and a spigot 55 also extending from the body 33. Each finger 50 has an extended portion 60, an outer cam portion 65 and a compression section 70. The spigot 55 extends beyond the fingers 50, has an opening 75 extending therethrough to transfer fluid to or from the pipe 30 therethrough, and a raised outer cam portion 80 to allow the pipe 30 to fit there over during assembly.

The nut 25 has an internal threaded portion 85 with four threads about 90° apart that mates with the threaded section 45 on the body 33 in a first bore 90, a cam surface 95 that transitions to a second bore 100 that covers the sealing ring 20, and a third bore 105 that encircles the pipe 30. The nut, on an outer surface 110 has a flexible lock tab 115 that extend beyond the nut 25 to interact with the fitting ramps 40 as will be discussed hereinbelow.

To assemble the coupling, pipe 30 is extended through the nut 25 and the sealing ring 25 is disposed over the pipe 25 and in the third bore 100 of the nut. The nut is pushed towards the fitting 15 and the pipe 25 then extends over the closely fitting outer cam surface 80. The sealing nut now extends over the spigot 55 and the pipe 30. As the threaded portion 85 and the threaded section 45 engage and the nut 25 is rotated, the axial movement of the cam surface 95 of the nut 25 engages the outer cam portion 65 of the fingers 50 driving the fingers 50 inwardly causing the a compression section 70 of the fingers 50 to engage the sealing ring 20 to create an effective seal between the pipe 30 and the spigot 55. The threads of the threaded portion 85 and the threaded section 45 are designed to engage so that a quarter turn of the nut will be sufficient to fully seal the coupling 10. At the end of the quarter turn, the lock tab 115 of the nut 25 engages the ramp 40 to lock the nut to the fitting 15. The lock tab 115 is arranged on the nut to coordinate with the engagement points of the threads so that the lock tab starts in approximate alignment with a ramp 40 and ends after about a quarter turn of the nut about the fitting just over an adjacent ramp to lock the nut thereon.

The thread angle of the threaded section 45 on the body 33 and the threaded portion 85 on the nut is relatively great (between 8-12° though any thread angle that allows the nut 25 to screw onto the fitting body 33 in a quarter turn and seal the coupling 10 may be used) and the threads, without more, may unscrew over time. Therefore, during assembly the lock tabs 115 on the nut 25 slide over the ramps so that the seal is maintained on the ring by the fingers because the compression nut cannot back off the fitting because the lock tabs 115 are constrained by a vertical portion 120 of the ramps 40 that is higher than at least a portion of the lock tabs. Though a ramp and tab are shown herein, other locking mechanisms may be used. The ramp and tab also give a user visual assurance that an appropriate seal has been made and may give an audible signal when the tab clicks over the ramp.

Figure 4:
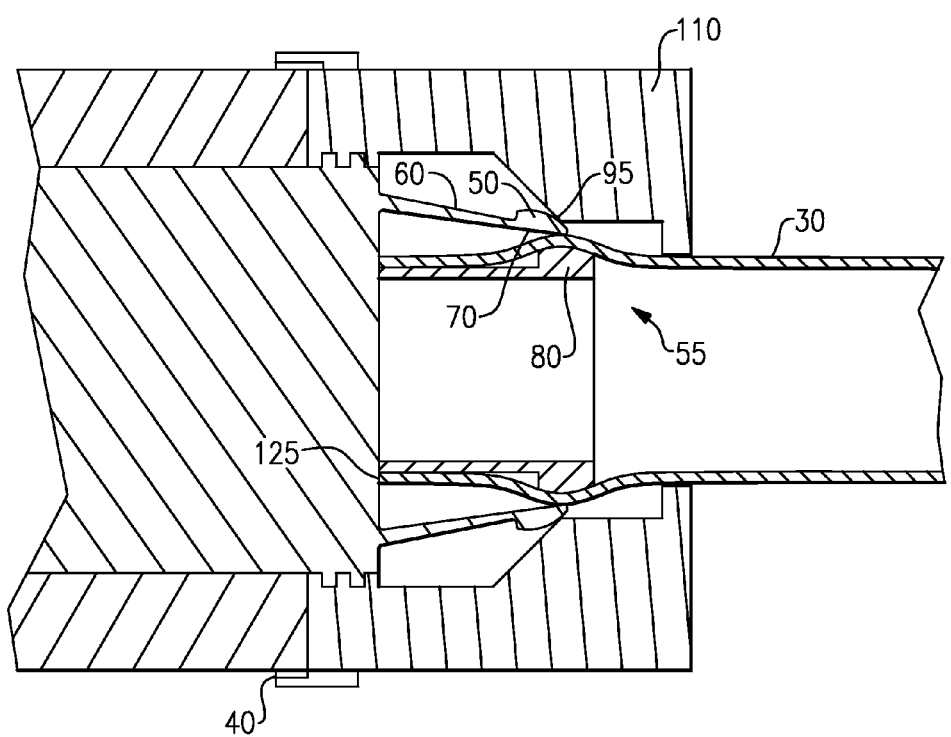
FIG. 4 is a schematic view of another embodiment of a sealing system.

Referring now to FIG. 4, another embodiment of the invention is shown. In this embodiment, the pipe 30 is malleable and because of this property, the pipe 30 may stretch directly over the outer cam surface 80 of the spigot 55 and a sealing ring 20 as shown in FIGS. 1-3 is unnecessary. Compression of the pipe 30 by the compression section 70 of the fingers 50 to engage the sealing ring 20 to create an effective seal between the pipe 30 and the spigot 55.

To assemble the coupling and similar to the first embodiment shown in FIGS. 1-3, pipe 30 is extended through the nut 25. The nut is pushed towards the fitting 15 and the pipe 25 then extends over the closely fitting outer cam surface 80 and stops when it hits surface 125. As the threaded portion 85 and the threaded section 45 engage and the nut 25 is rotated, the axial movement of the cam surface 95 of the nut 25 engages the outer cam portion 65 of the fingers 50 driving the fingers 50 inwardly causing the a compression section 70 of the fingers 50 to engage the pipe 30 to create an effective seal between the pipe 30 and the spigot 55. The threads of the threaded portion 85 and the threaded section 45 are designed to engage so that a quarter turn of the nut will be sufficient to fully seal the coupling 10. At the end of the quarter turn, the lock tab 115 of the nut 25 engages the ramp 40 to lock the nut to the fitting 15.

The thread angle of the threaded section 45 on the body 33 and the threaded portion 85 on the nut is relatively great (between 8-12° though any thread angle that allows the nut 25 to screw onto the fitting body 33 in a quarter turn and seal the coupling 10 may be used) and the threads, without more, may unscrew over time. Therefore, during assembly the lock tabs 115 on the nut 25 slide over the ramps so that the seal is maintained on the ring by the fingers because the compression nut cannot back off the fitting because the lock tabs 115 are constrained by a vertical portion 120 of the ramps 40 that is higher than at least a portion of the lock tabs. Though a ramp and tab are shown herein, other locking mechanisms may be used.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. For instance, the principles of this invention may also apply to other types of threads like a bayonet mount. Also, the principles can extend to different degrees of turning of the nut 25. Similarly, the sealing ring 20 may be used with pipes that don't touch with a broader compression section 70 of the fingers 50 and differently angled cam surface 95. The scope of legal protection given to this disclosure can only be determined by studying the following claims.

What is claimed:

1. A fitting for a whirlpool, said fitting comprising:
a first pipe for carrying water,
a second pipe for carrying water, said first pipe and said second pipe having an interference fit with each other,
a coupling from which one of the pipes extends, said coupling having
a compressible member having a plurality of fingers disposed around one of said pipes, each of said fingers having a first side for engaging a seal and a second contoured side for engaging a camming surface
said seal disposed between said first pipe and said second pipe wherein said seal causes a seal between said first pipe and said second pipe if compressed by said first side of said fingers, and
a first thread,
a nut through which one of said pipes extends, said nut having,
a second thread for engaging said first thread and
said camming surface that engages said second side forcing said first side to compress said seal to sealingly engage said first and second pipes while said second thread engages said first thread wherein said first thread and said second thread have an angle whereby rotation of said nut relative to said compressible member causes said seal to sealingly engage said first and second pipes in less than a full turn of said nut.

2. The fitting of claim 1 wherein said nut makes a quarter turn to sealingly engage said first and second pipes.

3. The fitting of claim 1 further comprising;
a tab disposed on one of the nut or the fitting,
a lock disposed on the other of the nut or the coupling said lock extending from the other of the nut or the to the one of the nut or the coupling such that upon making a quarter turn of the nut, the lock engages the tab and prevents the nut from backing away from the coupling.

4. The fitting of claim 3 wherein the lock is a camming surface over which said tab travels.

5. The fitting of claim 1 wherein said fitting gives a visual signal that the fitting creates a seal.

6. The fitting of claim 1 wherein said fitting gives an aural signal that the fitting creates a seal.

7. A fitting for a whirlpool, said fitting comprising:
a first pipe for carrying water,
a second pipe for carrying water,
a seal extending over a length of said first pipe and a length of said second pipe,
a coupling from which one of said pipes extends, said coupling having
a flexible member that compresses said seal to sealingly engage
said first pipe and said second pipe, and
a first thread,
a nut, said nut having,
a second thread for engaging said first thread and
a surface for engaging said flexible member and causing said flexible member to sealingly engage said seal and seal said first and second pipes while said second thread engages said first thread
wherein said first thread and said second thread have an angle whereby said surface causes said flexible member to sealingly engage said first and second pipes in a quarter turn of said nut.

8. The fitting of claim 7 further comprising;
a tab disposed on one of the nut or the fitting,
a lock disposed on the other of the nut or the fitting said lock extending from the other of the nut or the fitting to the one of the nut or the fitting such that upon making a quarter turn of the nut, the lock engages the tab and prevents the nut from backing away from the quarter turn.

9. A fitting for sealing two pipes, said fitting comprising:
a seal extending over a length of both of said pipes each of said pipes carrying a fluid,
a coupling from which one of said pipes is adapted to extend, said coupling having
a flexible member adapted to cause said seal to sealingly engage said pipes, and
a first thread, a nut, said nut having,
  a second thread for engaging said first thread and
  a surface for engaging said flexible member and causing said flexible member to sealingly engage said first and second pipes while said second thread engages said first thread
wherein said first thread and said second thread have an angle whereby said flexible member causes said seal to sealingly engage said first and second pipes in less than a full turn of said nut.

10. The fitting of claim 9 further comprising;
a cam surface disposed on one of the nut or the fitting
a lock disposed on the other of the nut or the fitting said lock extending from the other of the nut or the fitting to the one of the nut or the fitting such that upon making a quarter turn of the nut, the lock slides over the cam surface and prevents the nut from backing away from the quarter turn.

* * * * *